United States Patent
Nagaoka et al.

(10) Patent No.: US 6,651,174 B1
(45) Date of Patent: Nov. 18, 2003

(54) FIREWALL PORT SWITCHING

(75) Inventors: Toru Nagaoka, Tokyo (JP); Masashi Sakata, Tokyo (JP); Kazue Kobayashi, Tokyo (JP)

(73) Assignee: NTT Comware Corporation (JP)

( * ) Notice: Subject to any disclaimer, the term of this patent is extended or adjusted under 35 U.S.C. 154(b) by 0 days.

(21) Appl. No.: 09/274,384

(22) Filed: Mar. 23, 1999

(30) Foreign Application Priority Data

May 27, 1998 (JP) ............................................ 10-146372

(51) Int. Cl.$^7$ .................................................. H04L 9/00
(52) U.S. Cl. ........................................ 713/201; 709/239
(58) Field of Search ................................. 713/200, 201, 713/202, 150, 168, 169; 710/12; 709/223, 224, 225, 227, 228, 230, 238, 239, 250; 703/25; 370/351, 357, 359

(56) References Cited

U.S. PATENT DOCUMENTS

| | | | | | |
|---|---|---|---|---|---|
| 5,734,865 | A | * | 3/1998 | Yu ............................... | 709/250 |
| 5,852,721 | A | * | 12/1998 | Dillon et al. ................ | 709/217 |
| 5,968,129 | A | * | 10/1999 | Dillon et al. ................ | 709/233 |
| 5,995,725 | A | * | 11/1999 | Dillon ......................... | 709/203 |
| 6,088,728 | A | * | 7/2000 | Bellemore et al. ........... | 709/227 |
| 6,098,172 | A | * | 8/2000 | Coss et al. ................... | 713/201 |
| 6,104,716 | A | * | 8/2000 | Crichton et al. ............. | 370/401 |
| 6,141,749 | A | * | 10/2000 | Coss et al. ................... | 713/162 |
| 6,154,775 | A | * | 11/2000 | Coss et al. ................... | 709/225 |
| 6,170,012 | B1 | * | 1/2001 | Coss et al. ................... | 709/229 |
| 6,185,598 | B1 | * | 2/2001 | Farber et al. ................ | 709/200 |
| 6,195,366 | B1 | * | 2/2001 | Kayashima et al. ......... | 370/475 |
| 6,202,157 | B1 | * | 3/2001 | Brownlie et al. ............ | 713/201 |
| 6,253,751 | B1 | * | 7/2001 | Carlsson ...................... | 123/683 |
| 6,321,259 | B1 | * | 11/2001 | Ouellette et al. ............ | 709/220 |
| 2002/0073338 | A1 | * | 6/2002 | Burrows et al. ............. | 713/201 |

OTHER PUBLICATIONS

Wong, "Serving up digital certificates" May 1, 1998, Network, Dialog text search, p. 1–6.*
Rutrell, "VPN authentication moves to LANs– Alcatel adds Radius technology, typically used for remote access, to its switch" 2000, Internetweek, #810, Dialog text search, p. 1.*
Freier et al, "The SSL Protocol Version 3.0" Nov. 18, 1996, Transport Security Working Group, p. 1–67.*

* cited by examiner

Primary Examiner—Gail Hayes
Assistant Examiner—Christopher Revak
(74) Attorney, Agent, or Firm—Burns, Doane, Swecker & Mathis, LLP

(57) ABSTRACT

The present invention relates to a network system, the network system of the present invention comprises an authorized client terminal which is connected to a network, a server which is connected to the network, and a firewall which is interposed between the server and the network. The client terminal accesses the server by means of a publicly known protocol via a port having a publicly known port number in the firewall. In the case in which the accessing client terminal is authorized, the server downloads program for realizing effective dedicated protocols solely between the client terminal and itself to the client terminal via the port having the publicly known port number. Furthermore, the server access with the client terminal conducts data communication by executing the program and by means of the dedicated protocols, via the network and the port having the publicly known port number.

6 Claims, 8 Drawing Sheets

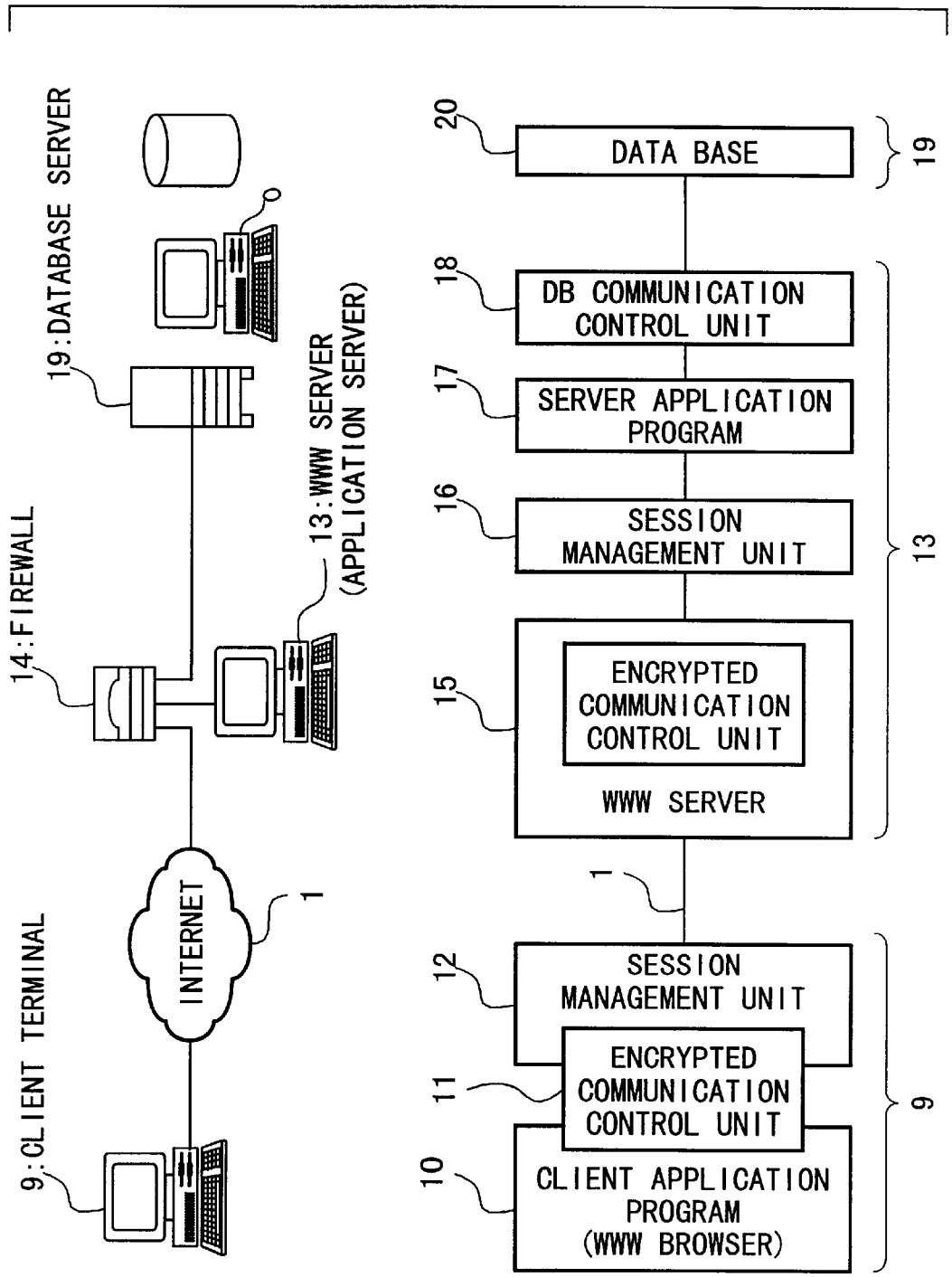

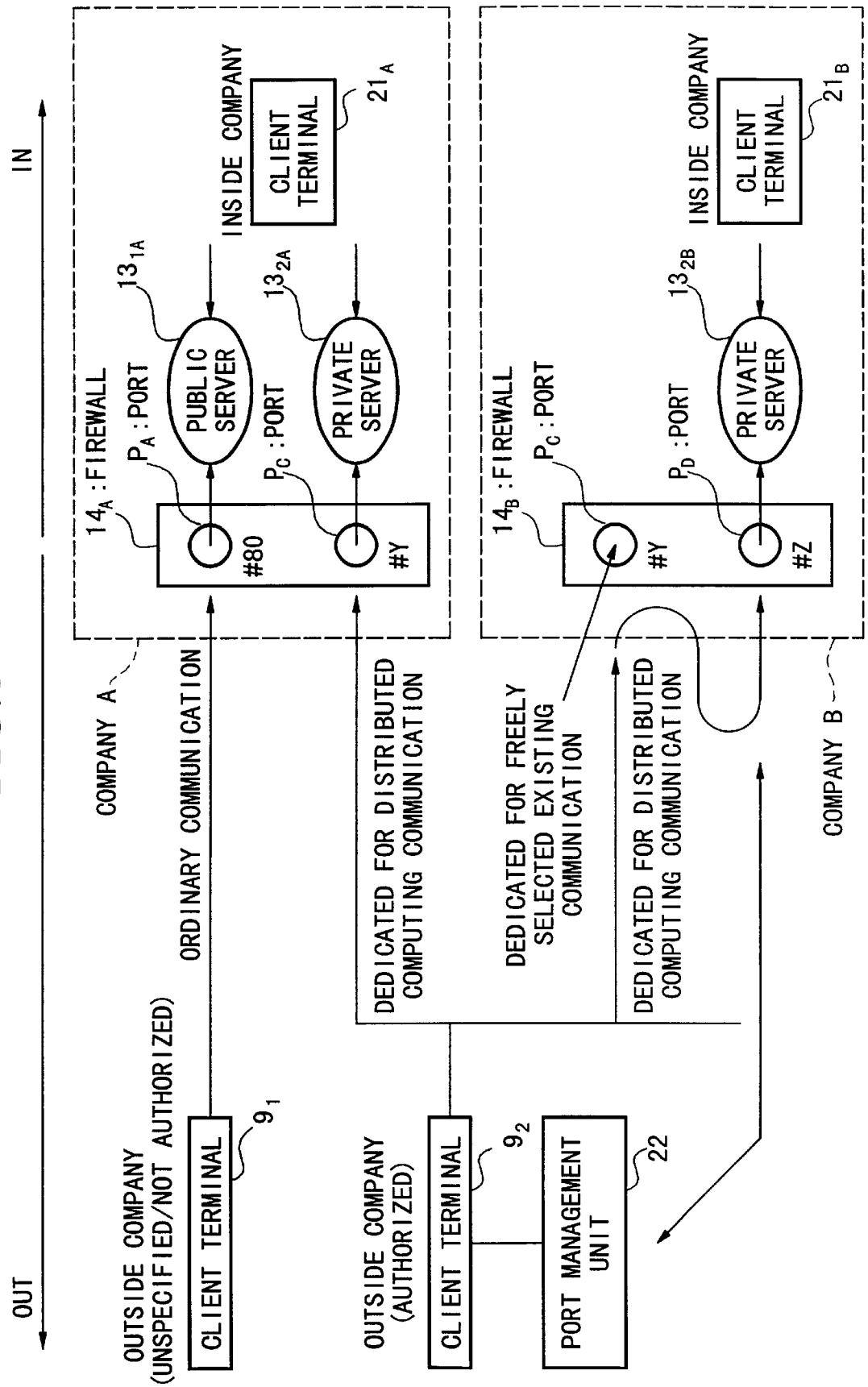

FIREWALL PORT SWITCHING

BACKGROUND OF THE INVENTION

1. Field of the Invention

The present invention relates to a network system which is employed in the access to servers via networks from client terminals.

This application is based on patent application No. Hei 10-146372 filed in Japan, the contents of which are incorporated herein by reference.

2. Description of the Related Art

Conventionally, in LAN (local area network) environments in corporations, various types of controls necessary for the main business were employed, so that the connection of the LAN system or the like via the internet has been difficult as a result of problems regarding the advisability of protocols for passage through firewalls to be described hereinbelow, and the like.

However, recently, as a result of the penetration of distributed computing technologies and the spread of Java, it has become possible to construct network systems by means of connecting company-wide LAN systems via the internet. Here, when this type of network system is constructed, by means of installing a firewall, security is maintained.

Here, a firewall is a system which is installed at the point of attachment between the information system itself and the internet, and which serves the function of a firewall; it prevents the unpermitted intrusions from unauthorized individuals and keeps out computer viruses.

Furthermore, in network systems having firewalls such as that described above, there may be limitations in accordance with security policies with respect to classifications of protocols which may be employed in this environment, and thereby, by disallowing the passage of freely selected protocols, security is maintained.

FIG. 5 shows the outlines of the composition of the conventional network system described above. In this figure, reference 1 indicates the internet, in which a plurality of networks are connected to one another, and in the example shown in FIG. 5, internet 1 connects the LAN of company A and the LAN of company B. In company A, reference 2 indicates a database server which stores various databases in a storage unit, and this is connected to internet 1 via firewall 3.

It is only possible for authorized terminals to access the database server 2 via firewall 3. Unauthorized terminals are incapable of accessing database server 2 through firewall 3. Reference 4 indicates a public WWW (world wide web) server which is connected to the internet 1, and this is freely accessible by any terminal irrespective of its authorized or non-authorized status.

In company B, reference 5 indicates a database server which stores various databases in the storage unit thereof; this is connected to internet 1 via firewall 6. Only authorized terminals are capable of accessing this database server 5 via firewall 6. Reference 7 indicates a public WWW server which is connected to internet 1, and this server is accessible by terminals irrespective of their authorized or non authorized status. Reference 8 indicates a company internal WWW server which is connected to internet 1 via firewall 6; this company internal WWW server 8 may be accessed via firewall 6 only by authorized terminals.

FIG. 6 shows the main parts of the composition of a conventional network server. In this figure, reference 9 indicates a client terminal which is installed on the client side and is connected to internet 1. This client terminal 9 conducts access to the WWW server 13 and the database server 19 described hereinbelow via internet 1. In client terminal 9, reference 10 indicates a client application program which is executed by client terminal 9; this program serves to conduct communication control, encryption control, protocol control, and the like. Furthermore, the client application program 10 is a program which is executed when other company-side applications are employed from client terminal 9 via internet 1. Reference 11 indicates an encrypted communication control unit, which has the function of controlling an encoding dedicated protocol for conducting encryption and decoding of data grams passing through specified protocol service ports defined in advance, irrespective of the attributes of the data (for example, an SSL or secure socket layer). Reference 12 indicates a session management unit which manages the sessions.

WWW server 13 is connected to internet 1 via firewall 14, and is a terminal which functions using the startup from client terminal 9 as an opportunity. Here, a plurality of ports are provided in firewall 14, and these ports may be broadly classified into standard ports for the communication of protocols from unauthorized client terminals 9, and security communication ports for communicating only those protocols from authorized client terminals 9.

In the WWW server 13 described above, reference 15 indicates an encrypted communication control unit having a function identical to that of the encrypted communication control unit 11 described above. Reference 16 indicates a session management unit which manages the sessions. Reference 17 indicates a server application program which is executed by WWW server 13, and which is employed in the control of communications with client terminals 9. Reference 18 indicates a DB (database) communication control unit which conducts the control of access to database 20 described hereinbelow. Database server 19 stores database 20 in the memory unit thereof.

Here, the operation of the network system shown in FIG. 6 will be explained using the operations explanatory diagrams shown in FIGS. 7A and 7B. FIG. 7A serves to explain the access operation from unauthorized company external client terminals $9_1$, while FIG. 7B serves to explain the access operation from unauthorized and authorized client terminals $9_1$ and $9_2$.

Here, in FIGS. 7A and 7B, client terminal $9_1$ corresponds to one unauthorized client terminal 9 in FIG. 6, and is located outside the company. Client terminal $9_2$ corresponds to a different authorized client terminal 9 in FIG. 6, and is also located outside the company.

The firewalls 14 shown in FIGS. 7A and 7B have ports $P_A$ and $P_B$, and ports $P_A$ are ports which are assigned the port number #80, and which are installed for the purposes of access from an unspecified large number of client terminals. Accordingly, the port number #80 of port $P_A$ described above is public. On the other hand, port $P_B$ is provided with a port number #X, and is installed for the purposes of access from authorized client terminals $9_2$. Accordingly, this port number #X of ports $P_B$ is a number which may only be employed in communications by the clients of client terminals $9_2$ which have authorization. In other words, access to ports $P_B$ is only possible from specified client terminals $9_2$.

The public server $13_1$ and private server $13_2$ shown in FIGS. 7A and 7B correspond to the WWW server 13 shown in FIG. 6. Here, a client terminal $9_1$ is provided with access to public server $13_1$ via internet 1 and port $P_A$ of firewall 14. On the other hand, a client terminal $9_2$ accesses private server $13_2$ via internet 1 and the port $P_B$ of firewall 14. Reference 21 indicates a client terminal located within the company; since security is maintained on the inside of the firewall, this terminal may directly access public server $13_1$ and private server $13_2$.

In FIG. 7A, the unauthorized client terminal $9_1$ commonly accesses public server $13_1$ through port $P_A$ of firewall 14 using http (hypertext transfer protocol). At this time, the http described above is capable of passing through port $P_A$.

Here, when an attempt is made to access private server $13_2$ from client terminal $9_1$, since the client of client terminal $9_1$ does not know the port number #X of port $P_B$, it is impossible to pass through the firewall 14. In other words, the http from client terminal $9_1$ is not capable of passing through port $P_B$, so that no communication is established between client terminal $9_1$ and private server $13_2$. Accordingly, in this case, client terminal $9_1$ is incapable of accessing private server $13_2$, and security is maintained.

On the other hand, in FIG. 7B, in the case in which client terminal $9_2$ attempts to access private server $13_2$, client terminal $9_2$ employs the security communication dedicated protocol, and first accesses port $P_B$. At this time, the protocol described above is capable of passing through port $P_B$, so that client terminal $9_2$ is capable of accessing private server $13_2$.

In the conventional network system described above, more secure communication between companies are realized using a firewall; however, the needs are great.

However, in the firewall environment of the network system described above, the structure is one in which firewalls having a distributed structure are distributed stepwise in a plurality of steps, so that this presents a problem in that in order to enable a passage of a single new protocol through the firewall, an enormous amount of preparation and work are required. Examples of this preparation and work include the resetting of the firewall ports shown in FIG. 6, and the modification of the use of the client application program 10 and the server application program 17.

Here, the problems of the conventional network system will be explained with reference FIG. 8.

In FIG. 8, in the parts corresponding to FIGS. 7A and 7B, the same reference numbers are employed. In company A shown in FIG. 8, reference $14_A$ indicates a firewall having a function identical to that of the firewall 14 shown in FIG. 7; this is provided between internet 1 (see FIG. 6) and public server $13_{1A}$ and private server $13_{2A}$. Here, firewall $14_A$ is provided with ports $P_A$ and PC.

The port $P_A$ described above is given the port number #80, and is a port which is provided for the purposes of access from an unspecified large number of client terminals. On the other hand, port PC is given the port number #Y, and is provided for the purposes of access from authorized client terminals $9_2$ (distributed computing communications). This port PC is the security dedicated port. Accordingly, the port number #Y of PC may be employed in communications only by the clients of the authorized client terminal $9_2$. In other words, only specified client terminals $9_2$ are capable of accessing port PC. Reference $21_A$ indicates a client terminal which is installed in company A, which accesses public server $13_{1A}$ and private server $13_{2A}$.

Furthermore, in company B, reference $14_B$ indicates a firewall which is provided between internet 1 and private server $13_{2B}$, and this is also provided with port PD and port PC which is dedicated to distributing computing communication. Port PC described above is provided with port number #Y, while port PD is provided with a port number #Z. The port number #Y of port PC makes possible communications only from clients of the authorized client terminal $9_2$. The ports PC and PD are security dedicated ports.

In the structure described above, unauthorized client terminal $9_1$ commonly accesses public server $13_{1A}$ via the port $P_A$ of firewall $14_A$ using http (hyper text transfer protocol). At this time, this http is capable of passing through port $P_A$. Client terminal $9_1$ is incapable of accessing the servers through port PC of firewall $14_A$ and ports PC and PD of firewall $14_B$ in the same way as in the operations described above.

On the other hand, when access is conducted from client terminal $9_2$ to private server $13_{2A}$, client terminal $9_2$ first accesses port PC of firewall $14_A$ using a security communications dedicated protocol. At this time, this protocol is capable of passing port PC, so that client terminal $9_2$ is capable of accessing private server $13_{2A}$.

Here, the case is explained in which the client terminal $9_2$ accesses the private server $13_{2B}$ via port PC of firewall $14_B$, in the state in which the firewall $14_B$ has already been allocated for other service protocols.

In this case, port PC is closed, so that it is necessary to establish port PD in firewall $14_B$. The information regarding this modification of the port setting must be communicated to the manager of client terminal $9_2$.

Here, a port management unit 22, which manages the port data in the plurality of firewalls, is provided in client terminal $9_2$.

Here, in the conventional network system (see FIG. 8), in order to realize distributed computing, access should be made possible from client terminal $9_2$ and the like to all destination systems (systems within other companies) in which all necessary functions (server applications) are present, and security control for satisfying all security policies is conducted.

However, as explained with reference to FIG. 8, in conventional network systems, the port setting modification rules differ from company to company, and this increases the complexity of the management of definitional data to port managing unit 22, and makes the control more complex.

Accordingly, in order to add conditions for port setting of this type, and to conduct the execution of applications with respect to work units, it is necessary to research and develop extremely complex installation methods. In particular, with respect to changes in installation with respect to security matters, this is a necessary and extremely serious matter for consideration for the company units, and represents an obstacle to the rapid realization of such systems.

SUMMARY OF THE INVENTION

For this reason, it is an object of the present invention to provide a network system which does not require individual security dedicated ports for the establishment of firewall security.

In this invention, the network system is provided with authorized client terminals connected to the network, with a server connected to the network, and with a firewall which is interposed between the server and the network. The object described above may be obtained by means of a server for a network system which, in the case in which, when a client terminal accesses the server by means of a public protocol via a port with a publicly known port number in a firewall, the accessing client terminal is an authorized terminal, downloads to the client terminal, via the port with the publicly known port number, a program for realizing effective dedicated control solely between the client terminal and server, conducts data communication with the client terminal via the network and the port with the publicly known port number by means of the dedicated control.

In the present invention, by means of using dedicated control, the port in the firewall is constantly a port with a known port number. Accordingly, port management on the client terminal side is unnecessary. By means of this, it is possible to obtain a network system which does not require independent security dedicated ports to establish firewall security.

Furthermore, in the network system, in the case in which there is a proxy server which conducts the port switching in the firewall, the network server communicates the first port to the client terminal as the communication port, and sets the port it itself employs as a second port having a port number other than the publicly known port number. Additionally, the network server conducts data communication with the client terminal via the networks, the firewall, and the proxy server using the dedicated protocol.

By means of this, even in the case in which a proxy server is installed in the network system, it is possible to obtain a network system which does not require an independent security dedicated port in order to establish firewall security.

The network system server preferably conducts the encryption and decoding of data in the data communication.

By means of this, an effect is obtained whereby secure communications are realized.

BRIEF DESCRIPTION OF THE DRAWINGS

FIG. 6 shows the main parts of the structure of a conventional network system.

FIG. 8 serves to explain the problems present in the conventional network system.

DESCRIPTION OF PREFERRED EMBODIMENTS

The embodiments described hereinbelow should not be construed as limiting the invention described in the Claims. Furthermore, it is not the case that all combinations of features described in the embodiments are necessarily required in order to achieve the object of the present invention.

Figure 1:
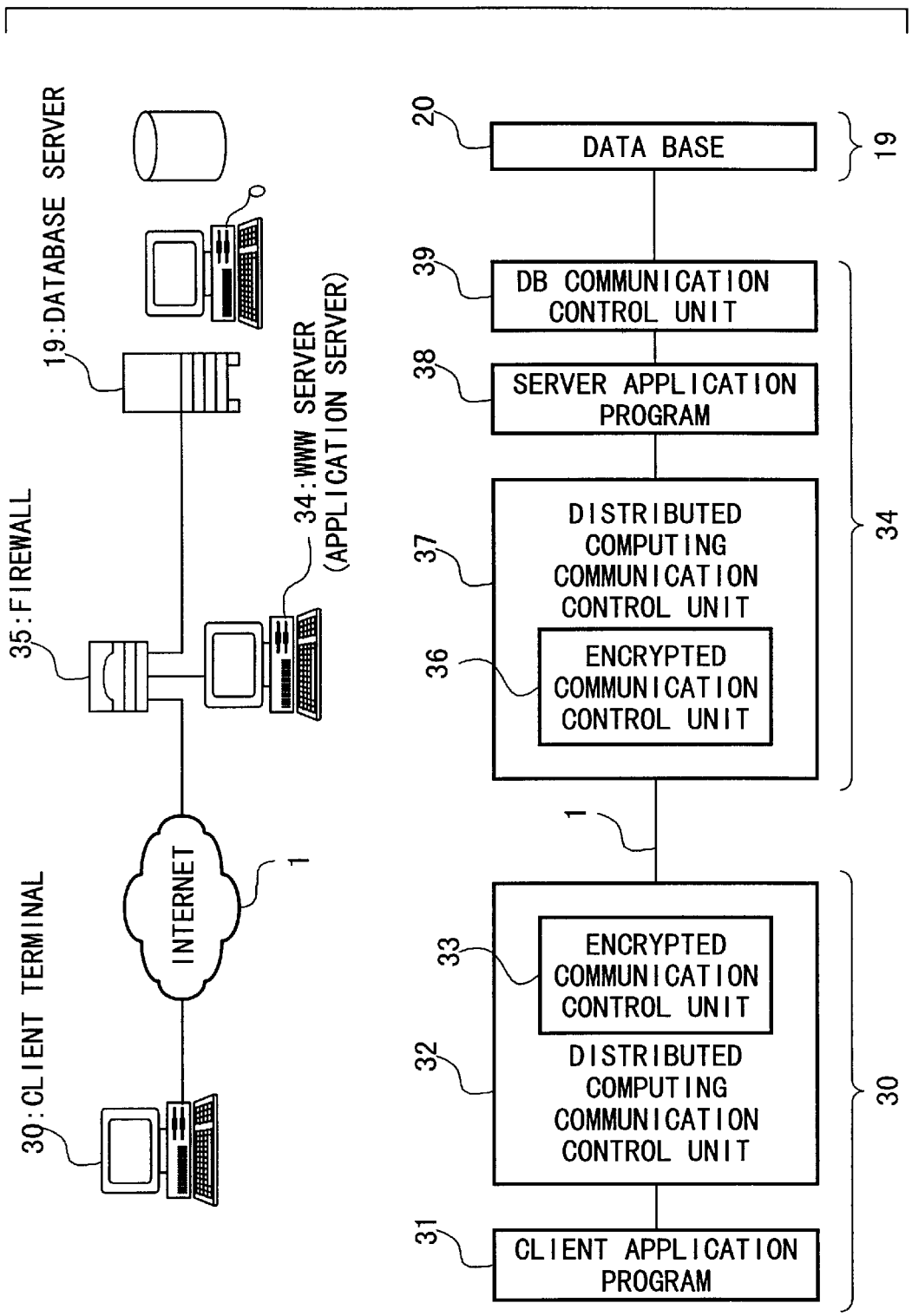
FIG. 1 shows the structure of the main parts of a network system in accordance with an embodiment of the present invention.

Hereinbelow, embodiments of the present invention will be explained with reference to the figures. FIG. 1 shows the main parts of the structure in a network system in accordance with an embodiment of the present invention. In this figure, parts corresponding to the parts in FIG. 6 are given identical reference numbers.

Reference 30 shown in FIG. 1 indicates a client terminal which is located at the client side; this is connected to internet 1. This client terminal 30 accesses WWW server 34 and database server 19 described hereinbelow via internet 1.

In client terminal 30, reference 31 indicates a client application program which is executed by client terminal 30; this program serves to conduct communication control, encryption control, and protocol control and the like. Furthermore, client application program 10 is executed when the dedicated control described hereinbelow is employed, and is a program which is executed when the other company-side applications are used from client terminal 30 via internet 1 and firewall 35.

Reference 32 indicates a distributed computing communication control unit; this dynamically connects a portion of a server application program 38 to be described hereinbelow with the client application program 31, and copies this. Furthermore, distributed computing communication control unit 32 has a communication protocol function which serves to realize and execution environment such that a portion of the server application program 38 described above may be manipulated just as if it were a preexisting work application program in client terminal 30. Reference 33 indicates an encrypted communication control unit, which has the same function as the encrypted communication control unit 11 in FIG. 6.

WWW server 34 is connected to internet 1 via firewall 35, and is a terminal which functions using the startup from client terminal 30 as an opportunity. A plurality of ports are provided in firewall 35; however, client terminal 30 employs the port with port number #80 in communications between client terminal 30 and WWW server 34 irrespective of whether client terminal 30 is authorized or not. This port with the port number #80 is public, and serves to allow the passage of common protocols such as http or the like. The setting state of the ports of this firewall 35, and the details of the communication protocols between client terminal 30 and WWW server 34 will be discussed hereinbelow.

In WWW server 34, reference 36 indicates an encrypted communication control unit which has a function similar to that of the encrypted communication control unit 11 described above. Reference 37 indicates a distributed computing communication control unit which has a similar function to that of the distributed computing communication control unit 32. Reference 38 indicates a server application program which is executed by WWW server 34 and which is used in the control of communications with client terminal 30 and the like. Furthermore, server application program 38 is a program which is executed when dedicated protocols described hereinbelow are employed. Reference 39 indicates a DB (database) communication control unit which conducts access control with respect to database 20.

Here, the structure resulting when the network system shown in FIG. 1 is applied to distributed computing communications between companies will be explained with reference to FIG. 2. In the network system shown in FIG. 2, the system within a company A and the system within a company B are connected via internet 1 (see FIG. 1), and a non-authorized client terminal $30_1$, and an authorized client terminal $30_2$ are connected to internet 1.

Figure 2:
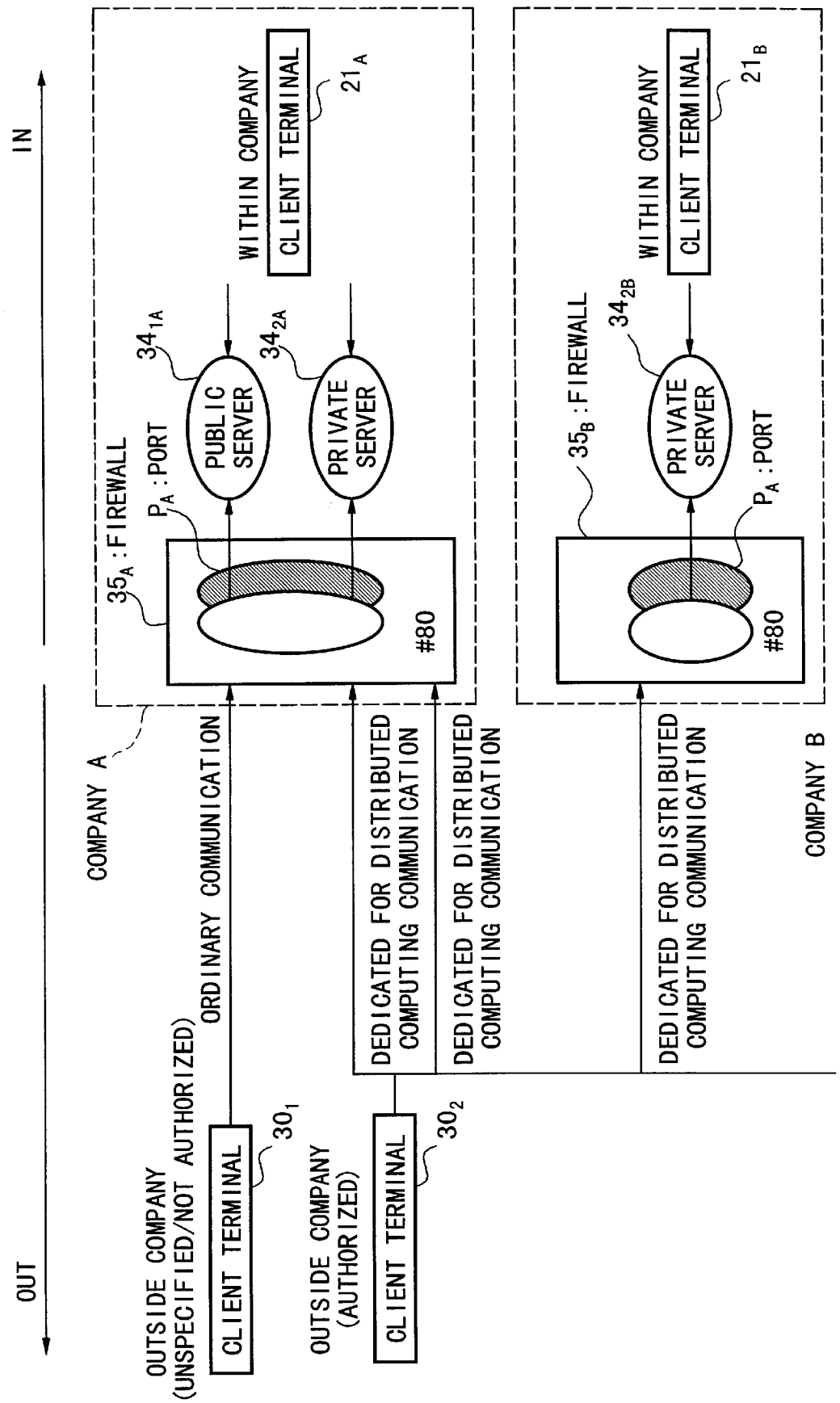
FIG. 2 shows the structure in the case in which a network system in accordance with this embodiment is applied to distributed communications between companies.

Here, the client terminal $30_1$ shown in FIG. 2 corresponds to one nonauthorized client terminal 30 shown in FIG. 1 and is located outside the companies. Client terminal $30_2$ corresponds to another client terminal 30 shown in FIG. 1 which is authorized and is also located outside the companies. Here, the client application program 31 shown in FIG. 1 is stored in the storage units of client terminals $30_1$ and $30_2$.

In company A, firewall $35_A$ corresponds to firewall 35 in FIG. 1, and has a port $P_A$. This port $P_A$ is given a port number of #80, and this port is set for the access of an unspecified large number of client terminals. In actuality, a plurality of logic ports are provided in firewall $35_A$, and the port numbers of these ports may be freely set. However, in the explanation which follows, the only port which is employed is that which has the port number #80.

Reference $34_{1A}$ indicates a public server corresponding to the WWW server 34 shown in FIG. 1, and this is accessed by client terminal $30_1$ via internet 1 and firewall $35_A$. Reference $34_{2A}$ indicates a private server corresponding to the WWW server shown in FIG. 1, and this is accessed by an authorized client terminal $30_2$ via internet 1 and firewall $35_A$ (port $P_A$) by means of dedicated protocols described hereinbelow. Here, the server application program 38 shown in FIG. 1 is stored in the storage unit of public server $34_{1A}$ and private server $34_{2B}$. Client terminal $21_A$ is located within company A, and accesses both public server $34_{1A}$ and private server $34_{2A}$.

On the other hand, in company B, firewall $35_B$ corresponds to the firewall 35 shown in FIG. 1, and has a port $P_A$. This port $P_A$ is located with port number #80. The function of this firewall $35_B$ is the same as the function of the firewall $35_A$. Reference $34_{2B}$ indicates a private server which may be accessed by client terminal $30_2$ via internet 1 and firewall $35_B$ (port $P_A$) using dedicated protocols. The server application program 38 shown in FIG. 1 is provided in the storage unit of this private server $34_{2B}$. The client terminal $21_B$ is located within company B, and accesses private server $34_{2B}$.

Next, the operation of the network system of the embodiment described above will be explained with reference to FIG. 3. In this figure, the parts corresponding to the parts of FIG. 2 are given identical reference numbers, and a description thereof will be omitted here. In the figure, the example is depicted in which the authorized client terminal $30_2$ shown in FIG. 2 accesses the private server $34_{2A}$ via internet 1 and the firewall $35_A$ within company A.

Figure 3:
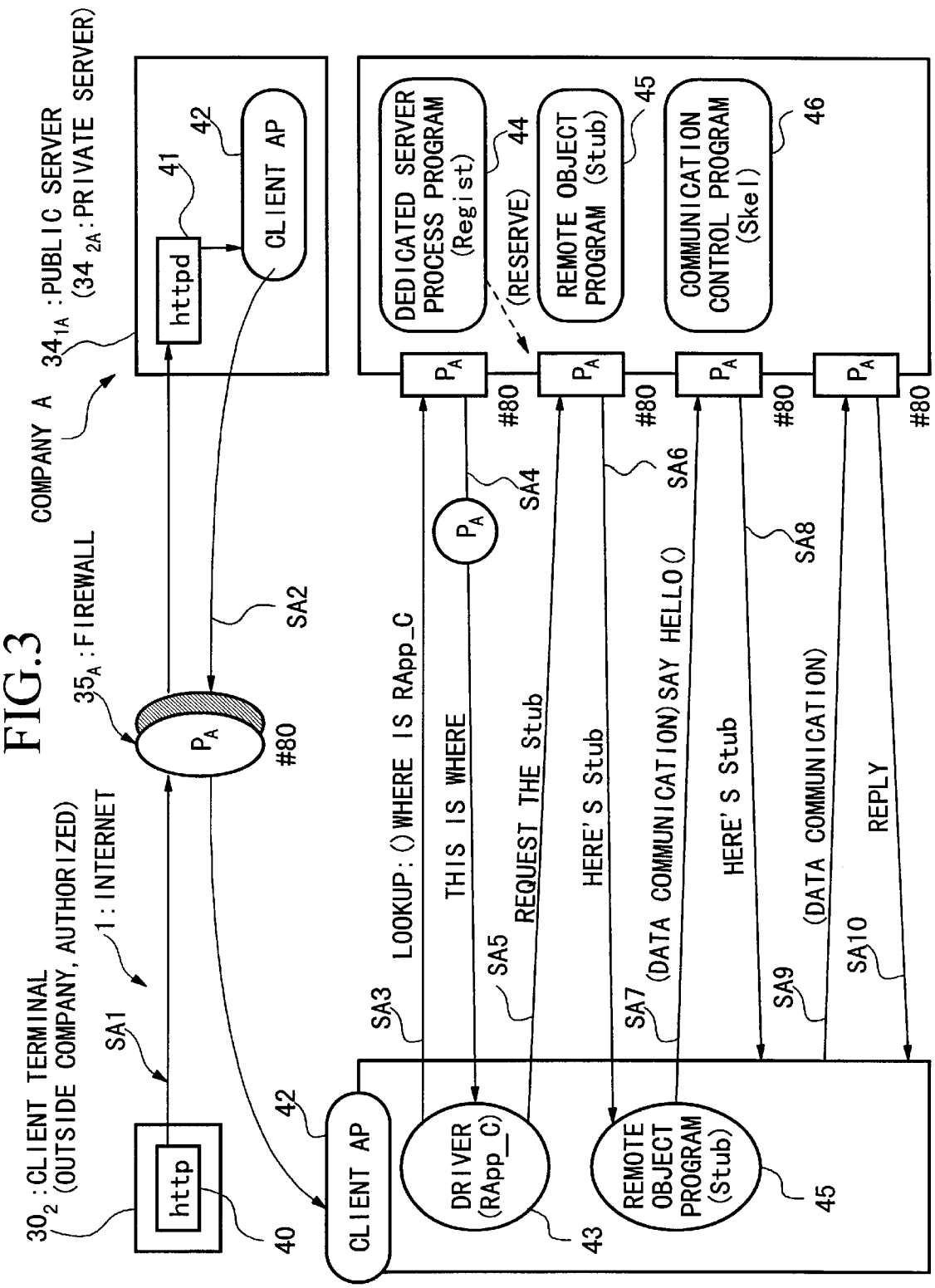
FIG. 3 serves to explain the operation of the network system of this embodiment.

Furthermore, in the firewall $35_A$ shown in FIG. 3, port $P_A$, and a port $p_A$ differing from this port $P_A$ are provided; however, the port number #80 is provided to all of these ports in a timely manner. Furthermore, in firewall $35_A$, the ports to which the port number #80 is assigned are altered.

Furthermore, the client application program (AP) 42 shown in FIG. 3 corresponds to the client application program 31 shown in FIG. 1, and has a driver (RApp_C) 43. This driver 43 comprises a portion of the function realized by client application program 42, and serves to control the control sequence between client terminal $30_2$ and private server $34_{2A}$.

Furthermore, dedicated server processing program (Regist) 44 is a program forming a portion of server application program 38, and serves to conduct the control of the communications between private server $34_{2A}$ and client terminal $30_2$. This dedicated server processing program 44 comprises a remote object program (stub) 45 and a communication control program (Skel) 46.

This remote object program 45 is transmitted to client terminal $30_2$ via firewall $35_A$ and internet 1, and is then executed by client terminal $30_2$; it serves to control communications. On the other hand, the communication control program 46 is executed by private server $34_{2A}$, and forms a pair with the remote object program 45, serving to control communications.

In the structure described above, when the private server $34_{2A}$ is started up, the dedicated server processing program 44 is executed, and private server $34_{2A}$ enters a state in which operations are possible. In this state, in step SA1, http 40 and client authorization data indicating authorization are sent from client terminal $30_2$ to firewall $35_A$ via internet 1. Now, if it is assumed that the port $P_A$ of firewall $35_A$ has been assigned the port number #80, then http 40 passes through port $P_A$ of firewall $35_A$, and enters private server $34_{2A}$.

By means of this, private server $34_{2A}$ makes a determination as to whether the client terminal $30_2$ is authorized or not, from the client authorization data included in a portion of the communication data initially transmitted, and if the server-side authorization fails, the server does not conduct further operations.

In the present case, since client terminal $30_2$ is an authorized terminal, private server $34_{2A}$ recognizes client application program 42 by means of an httpd (http daemon) 41.

Then, in step SA2, private server $34_{2A}$ downloads the client application program 42 in the form of a Java applet to client terminal $30_2$ via port $P_A$ and internet 1. By means of this, in client terminal $30_2$, the client application program 42 is executed, and thereby, distributed computing communications are initiated.

Next, in step SA3, client terminal $30_2$ submits a request to private server $34_{2A}$ for data relating to the ports (numbers) in firewall $35_A$ used in distributed computing communications, using driver 43 and via internet 1 and port $P_A$. By means of this, in step SA4, private server $34_{2A}$ reserves a port $p_A$ in place of port $P_A$, and the port number #80 is assigned to port $p_A$. That is to say, by means of this reservation, the port having the number #80 is changed from port $P_A$ to port $p_A$. The subsequent protocol sequence is all conducted via port $p_A$ (with the port number #80).

Next, in step SA4, private server $34_{2A}$ transmits data relating to port $p_A$ (port number #80), which was reserved as the port for conducting the protocol sequence, to client terminal $30_2$ via port $p_A$ and internet 1. By means of this, client terminal $30_2$ recognizes that the port of firewall $35_A$ which is to be subsequently used is port $p_A$ (port number #80).

Next, in step SA5, client terminal $30_2$ sends data serving to request a download of the remote object program 45, which is necessary for communications via the stipulated port $p_A$ (port number #80), to private server $34_{2A}$ via internet 1 and port $p_A$. By means of this, in step SA6, private server $34_{2A}$ downloads remote object program 45 to client terminal $30_2$ via port $p_A$ and internet 1.

By means of this, in client terminal $30_2$, the remote object program 45 is executed. Thereinafter, in the manner shown in steps SA7–SA10, data communication is conducted between client terminal $30_2$ and private server $34_{2A}$ via internet 1 and the port $p_A$ of firewall $35_A$. Furthermore, in this data communication, the encryption and decoding of the data is conducted by the encrypted communication control units 33 and 36 shown in FIG. 1, so that secure communications may be realized.

As described above, in accordance with the network system of the present embodiment described above, by means of employing a dedicated protocol, a structure is achieved in which the port in firewall $35_A$ is always assigned the port number #80, so that port management in client terminal $30_2$ is unnecessary. From this, in accordance with the network system of the embodiment described above, an effect is achieved whereby it is possible to obtain a network system which does not require independent security dedicated ports for the setting of firewall security.

Furthermore, in accordance with the network system of the embodiment described above, an effect is achieved whereby it is possible to safely use distributed computing communications, the passage of which has not yet been recognized, without conducting special setting modification of the existing internet security policies.

Furthermore, in accordance with the network system of the embodiment described above, an effect is achieved whereby it is possible to realize practical convenience by means of conducting encryption and decoding with protocol levels with respect to all data passing through the ports of firewall $35_A$.

Furthermore, in accordance with the embodiment described above, since it is not necessary to add large modifications to the internet design established in the various companies, it is possible to complete design and installation in connected companies in an extremely short period of time, and accordingly, it is possible to construct a distributed system for connecting these companies in a short period of time.

In the foregoing, a network system in according with an embodiment of the present invention was described in detail; however, the actual structure is not limited to this embodiment, and design modifications and the like are also included in the present invention to the extent that they do not depart from the essential idea of the present invention.

Figure 4:
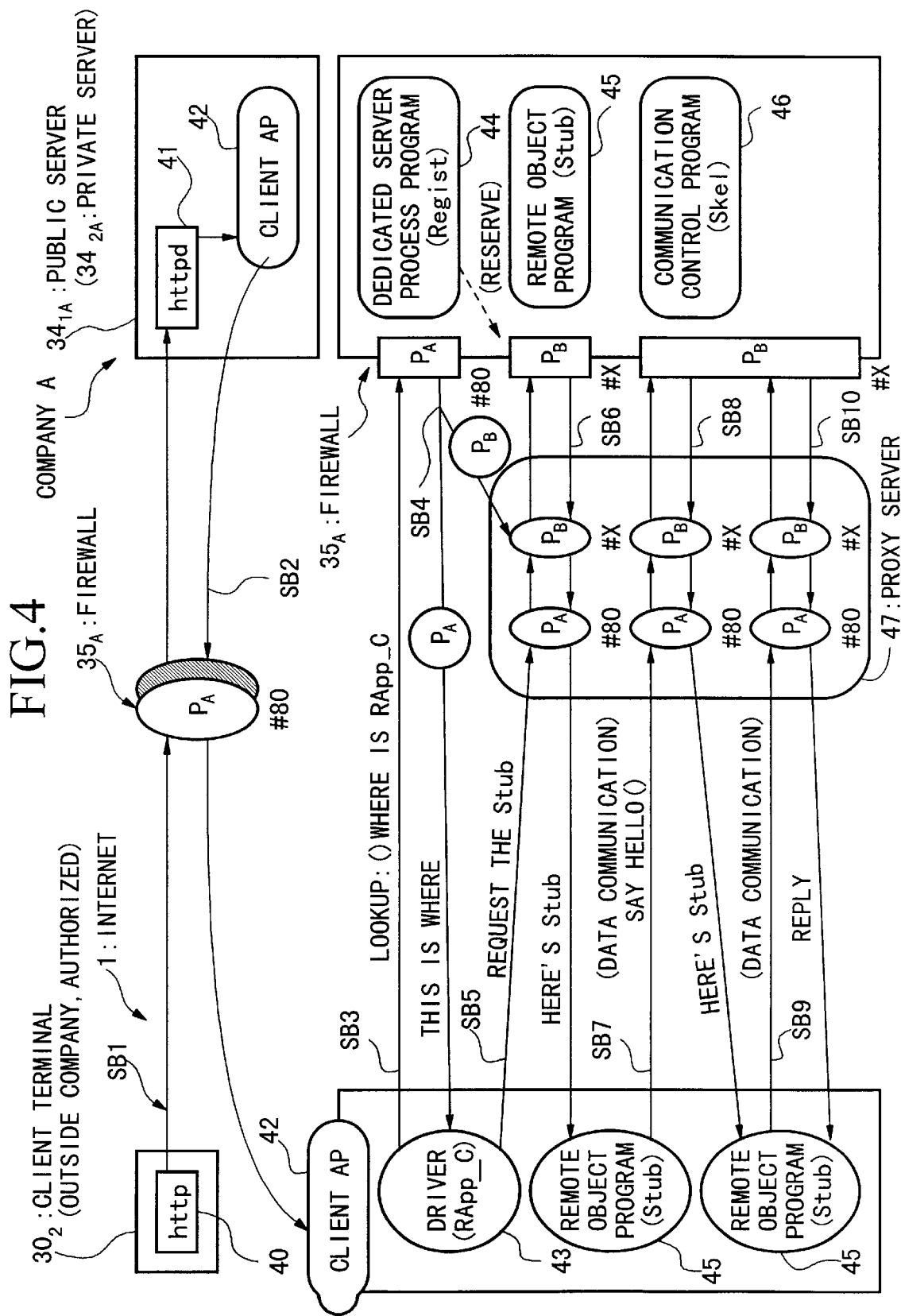
FIG. 4 serves to explain the structure and operation of the network system of another embodiment.
Figure 5:
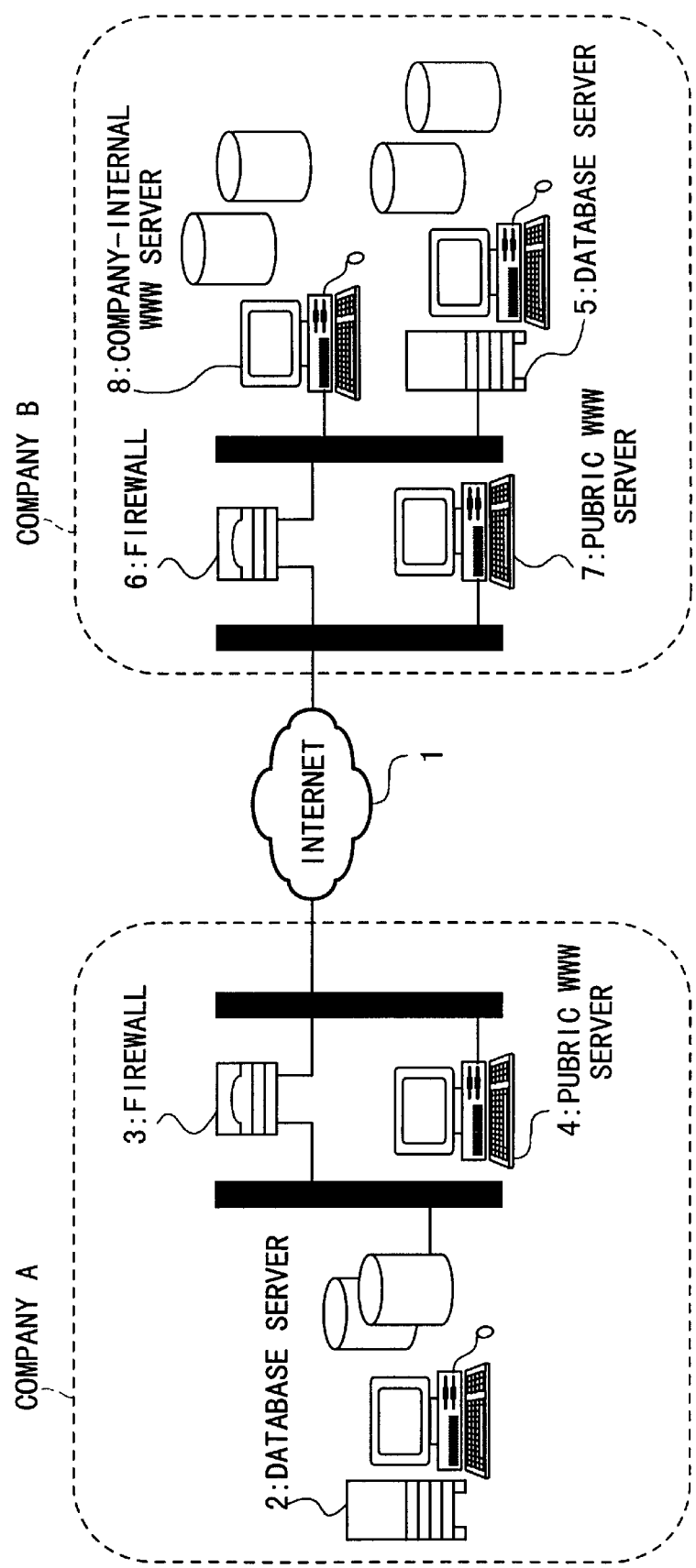
FIG. 5 shows the outline of the structure of a conventional network system.
Figure 7A:
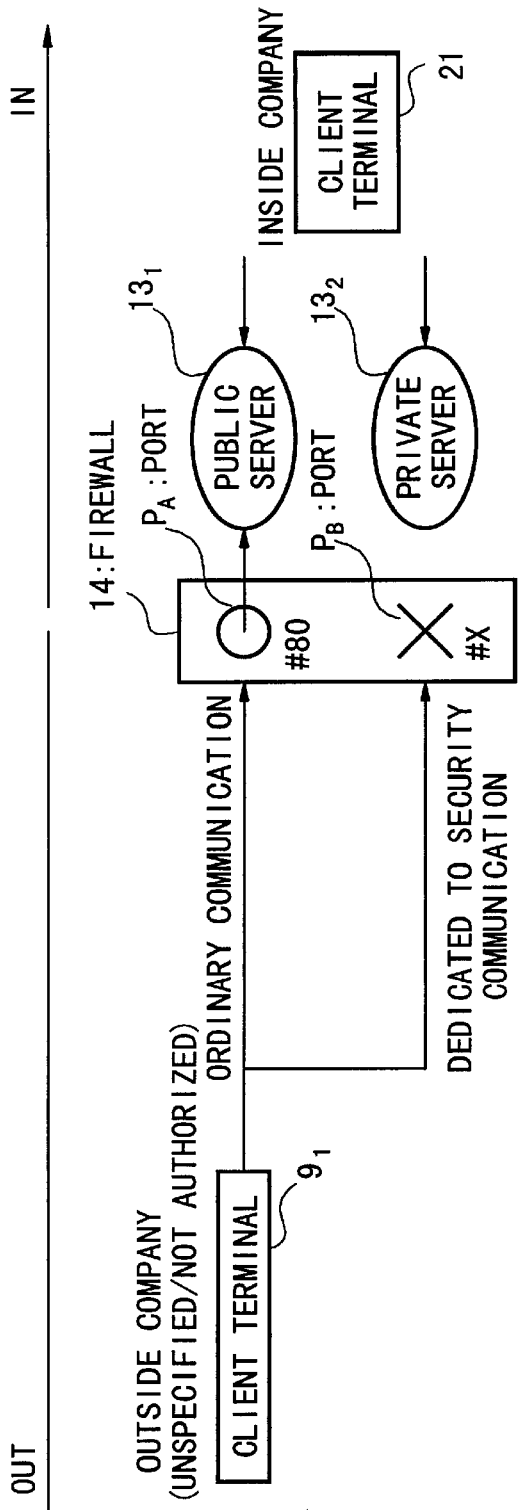
FIGS. 7A and 7B serve to explain the operation of the conventional network system.
Figure 7B:
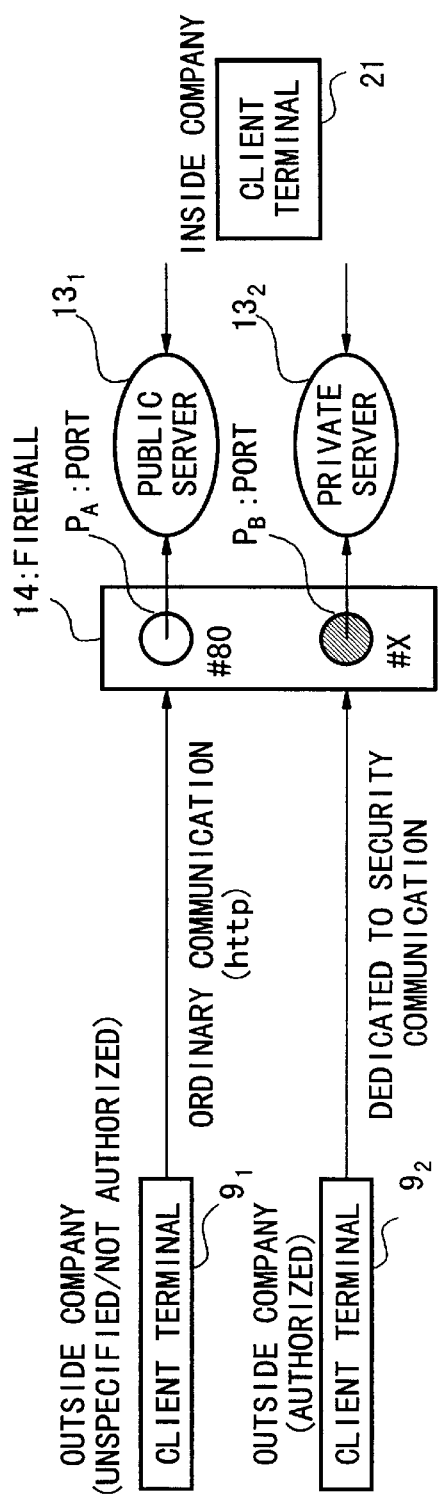

For example, in the network system in accordance with the embodiment described above, the structure shown in FIG. 3 was explained; however, it is also possible to adopt the structure shown in FIG. 4 in place thereof.

Hereinbelow, the network system shown in FIG. 4 will be explained.

In FIG. 4, the parts corresponding to the parts in FIG. 3 are given identical reference numbers, and an explanation thereof will be omitted here. In FIG. 4, a proxy server 47 is also provided. Furthermore, in FIG. 4, firewall $35_A$ is provided with a port $P_A$ having a port number #80, and a port $P_B$ having a port number differing from that of port $P_A$. The port number of port $P_B$ may be set to, for example, #X.

Proxy server 47 is provided at firewall $35_A$ (or private server $34_{2A}$), and this server serves to allow the passage of data from the private network on the company A side to a public network such as internet 1 or the like, or in the opposite direction.

In FIG. 4, proxy server 47 outputs data inputted into port $P_A$ to private server $34_{2A}$ via port $P_B$, and also outputs data inputted into port $P_B$ to internet 1 via port $P_A$, thus having a port-switching function. In other words, by means of proxy server 47, in the case in which private server $34_{2A}$ is seen from client terminal $30_2$, the accessible port is set to port $P_A$, while in the case in which the private server $34_{2A}$ is seen from private server $34_{2A}$, the accessible port is set to port $P_B$.

In the structure described above, when private server $34_{2A}$ is started up, the dedicated sever processing program 44 is executed, and private server $34_{2A}$ enters a state in which operations are possible. In this state, in step SB1, http 40 is outputted from client terminal $30_2$ to firewall $35_A$ via internet 1. Now, if it is assumed that port number #80 has been assigned to port $P_A$ of firewall $35_A$, then http 40 passes through port $P_A$ of firewall $35_A$ and enters private server $34_{2A}$. By means of this, private server $34_{2A}$, in the manner of the operations described above, recognizes client application program 42 by means of httpd 41.

Next, in step SB2, private server $34_{2A}$ downloads client application program 42 to client terminal $30_2$ as a Java applet or the like via port $P_A$ and internet 1. By means of this, the client application program 42 is executed in client terminal $30_2$, and by means thereof, distributed computing communications are initiated.

Next, in step SB3, client terminal $30_2$ sends a request via internet 1 and port $P_A$ to private server $34_{2A}$ for data relating to the port (number) in firewall $35_A$, which is used in distributed computing communications, using driver 43. By means of this, in step SB4, private server $34_{2A}$ reserves port $P_B$ (port number #X) as the port which it itself uses, and sends data relating to the port $P_B$ (port number #X) to proxy server 47. Furthermore, private server $34_{2A}$ sends data relating to port $P_A$ (port number #80), the port used by client terminal $30_2$, to client terminal $30_2$ via port $P_A$ and internet 1.

By means of this, in proxy server 47, the port switching of port $P_A$->port $P_B$ (port $P_A$<-port $P_B$) is defined.

By means of this definition, the protocol sequence in the case in which client terminal $30_2$ is viewed from private server $34_{2A}$ is conducted in port $P_B$ of firewall $35_A$, while the protocol sequence in the case in which private server $34_{2A}$ is viewed from client terminal $30_2$ is conducted in port $P_A$ of firewall $35_A$. That is to say, the private server $34_{2A}$ recognizes the port $P_B$ (port number #X) as the port for conducting distributed computing communications, while client terminal $30_2$ recognized port $P_A$ (port number #80) as this port.

Next, in step SB5, client terminal $30_2$ sends data for the purpose of requesting download of the remote object program 45, which is necessary for communications via the stipulated port $P_A$ (port number #80), to internet 1. By means of this, the data switching (port $P_A$->port $P_B$) is conducted in proxy server 42, and the data described above are inputted into private server $34_{2A}$ via ports $P_A$ and $P_B$.

By means of this, in step SB 6, private server $34_{2A}$ outputs remote object program 45 via port $P_B$. At this time, by means of proxy server 47, the port switching (port $P_B$->port $P_A$) is conducted, and remote object program 45 is downloaded to client terminal $30_2$ via port $P_B$, port $P_A$, and internet 1.

By means of this, in client terminal $30_2$, remote object program 45 is executed. Thereafter, as shown in steps SB7–SB10, data communication is conducted between client terminal $30_2$ and private server $34_{2A}$ via internet 1 and ports $P_A$ and $P_B$ of firewall $35_A$. Furthermore, in this data communication, the encryption and decoding of the data are conducted by means of the encrypted communication control units 33 and 36 shown in FIG. 1, so that secure communication can be realized.

Furthermore, in the network system of the embodiment described above, the computer readable program for executing the functions described above may be stored in a computer-usable medium, and this program stored in this medium may be read out to the computer system and executed. What is meant here by a computer system includes hardware such as an OS (operating system) or peripheral devices. Furthermore, the computer system may include a home page providing environment (or display environment) if a WWW system is employed.

As explained above, by means of the present invention, by using dedicated protocols, the port in the firewall is constantly set to a port having a publicly known port number, so that port management is not required on the client terminal side.

From this, by means of the present invention, an effect is obtained whereby it is possible to obtain a network system which does not require independent security dedicated ports for setting the firewall security.

Furthermore, by means of adding an encrypted communication control unit, the encryption and decoding of the data can be conducted, so that an effect is provided whereby it is possible to realize secure communications.

What is claimed is:

1. A network system comprising an authorized client terminal connected to a network, a server connected to a network, and a firewall interposed between said server and said network, wherein:

said client terminal accesses said server using publicly known protocol via a port with a publicly known port number in said firewall;

in the case when said client terminal conducting access is authorized, said server downloads a program for realizing effective dedicated protocol solely between said client terminal and said server to said client terminal via said port having said publicly known port number; and said client terminal and said server conduct data communication via said network and said port having said publicly known port number using said dedicated protocol by executing said program, wherein said network system further comprises a proxy server which conducts port switching in said firewall, and wherein:

in the case when said client terminal conducting access is authorized, said server downloads a program for realizing effective dedicated protocol solely between said client terminal and said server to said client terminal via a first port having a publicly known port number, whereafter communicates said first port to said client terminal as a port for communications, and sets a port used by said server as a second port having a port number other than said publicly known port number;

said proxy server switches a port seen from said client terminal from said first port to said second port, and switches a port seen from said server from said second port to said first port; and said client terminal and said server conducts data communication via said network, said firewall, and said proxy server using said dedicated protocol by executing said program.

2. A network system, according to claim 1, wherein:

said client terminal is provided with a first encrypted communication control unit which conducts encryption and decoding of data in said data communication; and said server is provided with a second encrypted communication control unit which conducts encryption and decoding of data in said data communication.

3. A server for a network system, wherein is provided a processing unit which, in the case when a client terminal conducting access by publicly known protocol, via a port having a publicly known port number in a firewall, is authorized, downloads a program, for realizing effective dedicated protocol solely between said client terminal and said server, to said client terminal via said port having said publicly known port number, and said server conducts data communication with said client terminal via said network and said port having said publicly known port number conducts using said dedicated protocol, wherein, in the case when a proxy server which conducts port switching in said firewall is present in said network system, said network server is further provided with a processing unit which communicates a first port to said client terminal as a port for communication, and sets a port used by said server as a second port having a port number other than said publicly known port number, and the server conducts data communication with said client terminal via said network, said firewall, and said proxy server using said dedicated protocol.

4. A server for network system, according to claim 3, wherein said network system server is further provided with an encrypted communication control unit which conducts encryption and decoding of data in said data communication.

5. A computer program product containing a computer readable program recorded on a computer usable medium, said program affecting the process of:

determining as to whether a client terminal conducting access using publicly known protocol via a port having a publicly known port number in a firewall is authorized or not;

in the case when the client terminal is authorized, downloading a program, for realizing effective dedicated protocol solely between said client terminal and a server, to said client terminal via said port having said publicly known port number; and conducting data communication with said client terminal using said dedicated protocol via said network and said port having said publicly known port number, wherein, in the case when a proxy server which conducts port switching in said firewall is present in said network system, said program further effecting the process of:

communicating a first port to said client terminal as a port for communication, and setting a port used by said server as a second port having a port number other than said publicly known port number; and conducting data communication with said client terminal using said dedicated protocol via said network, said firewall, and said proxy server.

6. A computer program product, according to claim 5, wherein said program effecting the process of:

conducting the encryption and decoding of data in said data communication.

* * * * *